Figure 9:
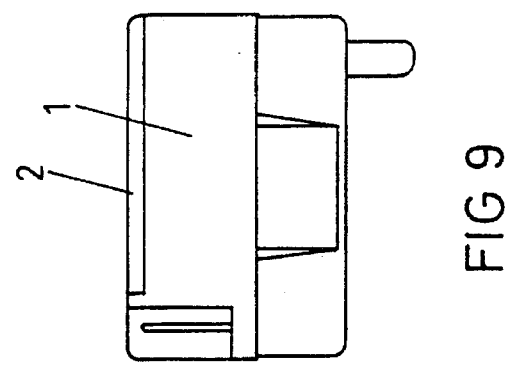

United States Patent [19]

Wilson et al.

[11] Patent Number: 5,553,567
[45] Date of Patent: Sep. 10, 1996

[54] PULSATOR UNIT FOR A MILKING MACHINE

[75] Inventors: Allan W. Wilson; James F. Pharaoh, both of Hamilton, New Zealand

[73] Assignee: Carter Holt Harvey Plastic Products Group Limited, Hamilton, New Zealand

[21] Appl. No.: 292,767

[22] Filed: Aug. 19, 1994

[30] Foreign Application Priority Data

Aug. 19, 1993 [NZ] New Zealand .............................. 248444

[51] Int. Cl.⁶ ........................................................ A01J 5/14
[52] U.S. Cl. ........................................................ 119/14.28
[58] Field of Search ............................... 119/14.28, 14.37, 119/14.38, 14.39, 14.40, 14.41; 251/129.16, 129.02

[56] References Cited

U.S. PATENT DOCUMENTS

| | | | |
|---|---|---|---|
| 4,524,720 | 6/1985 | Brayer | 119/14.28 |
| 4,889,314 | 12/1989 | Hashizume et al. | 251/129.16 |
| 5,040,567 | 8/1991 | Nestler et al. | 251/129.16 |
| 5,207,177 | 5/1993 | Lidman | 119/14.28 |
| 5,280,882 | 1/1994 | Kamiya et al. | 251/129.16 |

FOREIGN PATENT DOCUMENTS 2245069  3/1973  Germany .............................. 119/14.28

*Primary Examiner*—Todd E. Manahan
*Attorney, Agent, or Firm*—Jacobson, Price, Holman & Stern, PLLC

[57] ABSTRACT

A fluid pressure controlling unit including a housing defining at least one substantially fluid tight chamber having first, second and third ports. An arm is disposed, at least in part, in the at least one substantially fluid tight chamber and is capable of being moved between positions which close either the first or the second port. A spring biases the arm to close either the second port or the first port (preferably the second port). An electrically actuable device is capable of moving the arm to close the first port. When the arm closes the second port, the first and the third ports are in communication via the chamber(s), and, when the arm closes the first port, the second and the third ports are in communication via the chamber(s).

16 Claims, 2 Drawing Sheets

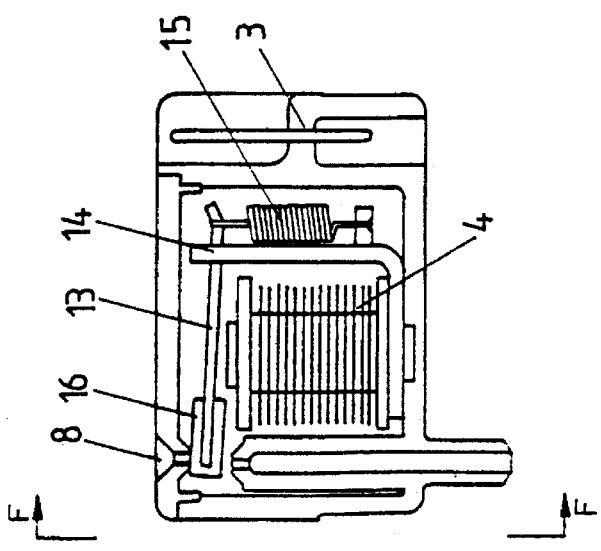
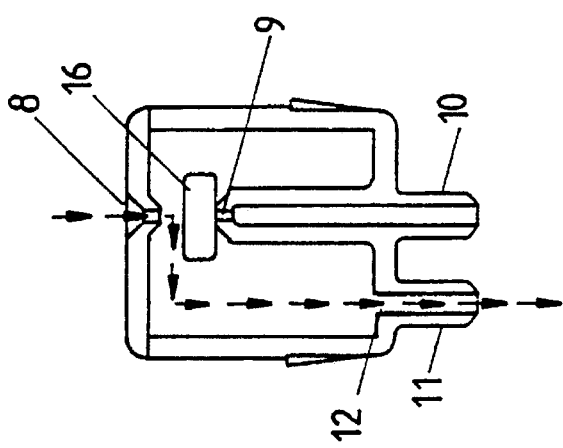
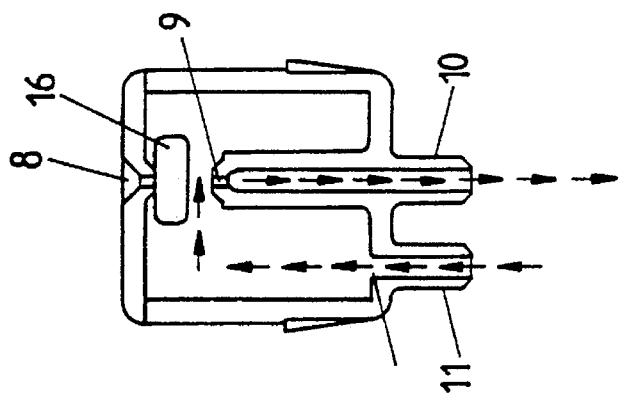
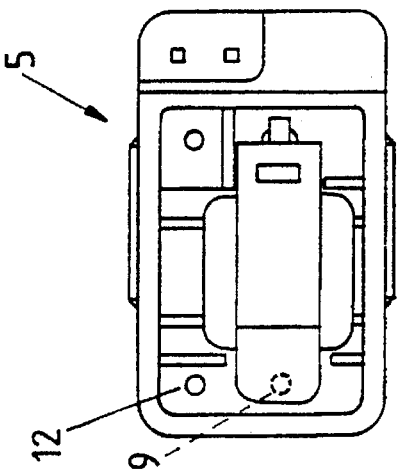

PULSATOR UNIT FOR A MILKING MACHINE

The present invention relates to improvements in and/or relating to a vacuum solenoid and/or other means and methods applicable in the control of periodic or pulsed pressure differentials involving fluids, whether air or otherwise.

A control of pressure or pressure differentials is frequently required and one common situation where such control is required is in the vacuum circuit of milking machinery. Such prior art structures have, from time to time, connected a vacuum or a first pressure line and/or an atmospheric or second pressure line to a controlled pressure line and provided either communication or no communication between the three on a controlled bases. Frequently, the control is under the action of an electrically or magnetically controlled shuttle or plunger.

The present invention relates to apparatus and related means and/or methods that provide an alternative to such systems, whether for use in milking machinery or in other situations where there is to be a control axis to or from a source of fluid pressure or pressure differential.

In a first aspect, the present invention consists in fluid pressure controlling apparatus comprising:

housing means defining at least one substantially fluid tight chamber having first, second and third ports;

an arm disposed, at least in part, in said at least one substantially fluid tight chamber capable of being moved between positions which closes either said first or second ports;

means to bias the said arm to close either said second port or said first port (preferably said second part); and electrically actuable means capable of moving said arm to close said first port, and wherein, when said arm closes said second port, said first and third ports are in communication via said chamber(s), and, when said arm closes said first port, said second and third ports are in communication via said chamber(s).

Preferably, said first port is a vacuum port for connection to the vacuum line of a milk machine.

Preferably, said second port is to the atmosphere.

Preferably, said third port (the "controlled port") is connected to a vacuum line in communication with a controlled part of a milking system.

In other forms of the present invention, other types of pressure differential to that just defined can exist.

Preferably, said arm is pivoted between said conditions but in other forms, preferably said arm is deformable.

Preferably, said means to bias said arm to close said second port is a spring.

Preferably, said spring acts on the arm at a region which extends in a different direct from a pivoting thereof to that region or regions which provide for the sealing of said first or second ports.

Preferably, a sealing material is applied or attached to said arm to provide an appropriate seal of said first and/or second ports.

Preferably, said housing means includes nipples extending outwardly from said first and third ports to facilitate attachment thereof to conduits, hoses, etc.

Preferably said arm is ferromagnetic and said electrical actuable means includes or is a solenoid.

In a further aspect, the present invention consists in a fluid pressure controlling apparatus in accordance with the present invention operatively connected into the pulsation system of a milking machine such that, in use, a vacuum can be applied into a milk claw from said pulsation system, controlled by said controlled (third) port with the control being by electrical actuation/de-actuation of a solenoid which is, or of, said electrical actuable means, and wherein said second port is to the atmosphere and said first port is to a vacuum source.

In a further aspect the present invention consists in milking machinery including a pulsating system and/or fluid pressure controlling apparatus in accordance with the present invention.

In yet a further aspect the present invention consists in a method of control of the pulsation of a milk cup inflation which involves the use of apparatus and methods in accordance with the present invention and/or substantially as hereinafter described with reference to the accompanying drawings.

One preferred form of the present invention will now be described with reference to the accompanying drawings in which;

FIG. 1 is a side elevation view showing the interior workings of the apparatus with the arm being shown biased to close said second port while leaving said first port open into the chamber defined by the housing, FIG. 2 is a view of the apparatus (simplified) as shown in FIG. 1 from the direction FF showing how atmospheric air or an other source of a fluid can enter said second port and communicate via the chamber with the third port (the controlled port) while the arm closes the first port, FIG. 3 is a similar view to that of FIG. 1 but showing the arm under the effect of its bias to close said second port while the solenoid is deactivated thereby allowing communication of fluid between the first port and third (controlled) port.

Figure 8:
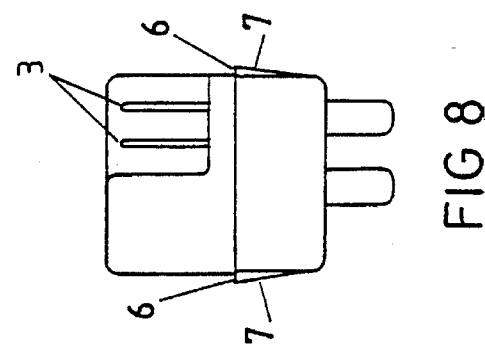
Figure 4:
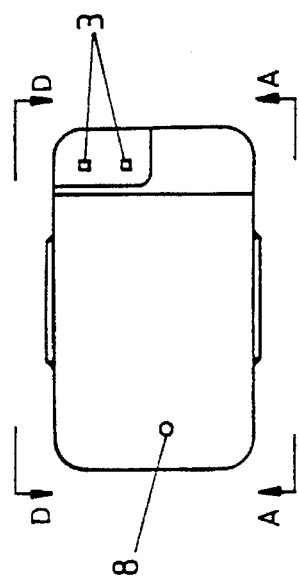
Figure 6:
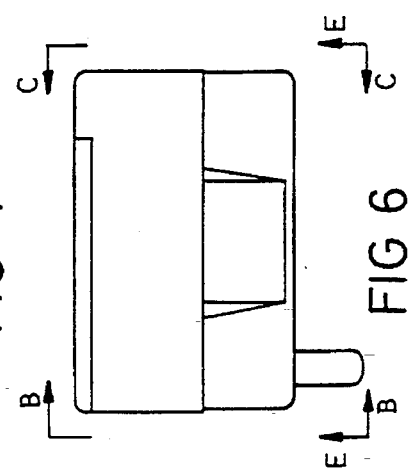
Figure 10:
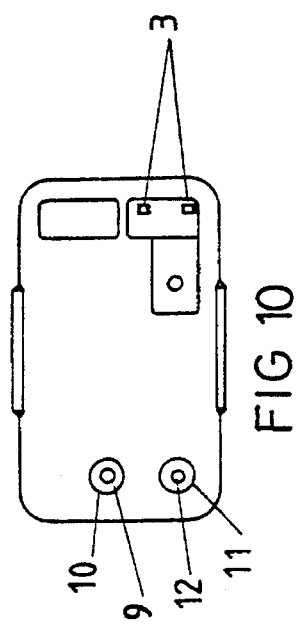
Figure 7:
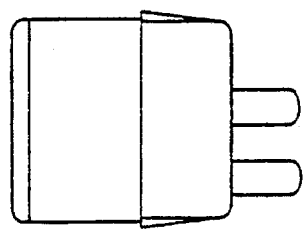

FIG. 4 is a top view of the apparatus shown in FIGS. 1 to 3 showing electrical connections for the solenoid of a plug in kind as well as showing the second port in the cover thereof, FIG. 5 is a similar view to that of FIG. 1 but with the normally sealed off substantially sealed enclosed cover thereof removed thereby showing the first and third ports, the arm being shown as being transparent to the extent required to reveal the first port, FIG. 6 is a similar view of the apparatus to that shown in FIG. 1 but showing the same from outside of the house without revealing any interior detail, FIG. 7 is an end view BB the apparatus of FIG. 6, FIG. 8 is a view from the end CC showing the nipples of said first and third ports and showing the electrically engageable contacts of the solenoid, FIG. 9 is a side elevation view from the direction DD (see FIG. 4), FIGS. 1 and 6 showing the side elevation AA with respect to FIG. 4, and FIG. 10 is a view EE of the apparatus with respect to FIG. 6.

In the preferred form of the present invention the electrically actuable system is under the control of a solenoid, that preferably acts on the ferro magnetism of, for example, a mild steel arm in the form of a bar or the like. In the preferred form of the present invention the bias is to close said second port but in other forms could be to close said first port.

The apparatus preferably is performed as a moulded plastics assembly comprising a main body 1 and a lid 2 for closing the chamber. The body preferably has electrical contacts 3 extending therefrom which are operatively connected to the solenoid coil 4 by a conductive structure within the housing.

The housing 5 is provided in a preferred clip fit engagement type means using abutment shoulders 6 that extend from clip fit type ramps 7.

It is envisaged that the apparatus as a whole will be a throw away unit but one which is interchangeable in appropriate mounting arrangements and which facilitates easy engagement with fluid conduits and electrical conduits.

There are three ports to the chamber of the housing with the second port 8 being to the atmosphere and being aligned over the first port 9 which includes a nozzle, nipple or ferrule capable of being received within the end of a hose or tube to pass to a vacuum source such as a pump or a reservoir in communication with such a pump. The nipple 11 is addition to the nipple 10 (preferably extending in the same direction but not necessarily so) is that of the third port 12.

As depicted particularly by reference to FIGS. 1 and 10 it can be seen that the electrical connection members 3 can be approached from the opposite side to that shown in FIG. 4 if required and there is the provision of means for connecting the same to the solenoid 4 (not shown for simplicity).

In operation therefore the arm 13 preferably pivoted at 14 is biased by a spring 15 to close the second port 8 as shown in FIGS. 1 and 3 with a sealing cap for example, of a silicon material 16, ensuring an effective seal. When the solenoid 4 is actuated in use against the biasing effect of the spring 15 the mild steel arm 13 pivots or deforms down to effect a seal as shown in FIG. 2 of the first port 9.

The structure of the present invention avoids the use of shuttles and/or plungers and has a number of advantages over prior art solenoid valves useful for controlling the supply of alternating pressure systems to a conduit.

One example arises from the fact that with the use of the solenoid arm combination it is possible to build within the housing 5 an efficient magnetic circuit providing for effective operation but with a very much reduced current, i.e. a current for example, of the order of 0.07 amps as opposed to 0.7 amps that might be required for a shuttle/plunger alternative system. This therefore provides for a saving in the cost of a power supply into a milking shed and/or the lowering of costs for any such power supply system. This is quite in addition to any energy savings.

Another major advantage is that with the positive spring loading the orientation of the device no longer becomes critical provided the bias is sufficient to operate against gravity if it is so mounted. Certainly the solenoid is capable of overpowering the effect of gravity on the arm as well as the spring bias.

Another advantage is that with no effort being required to isolate the solenoid/spring bias system from the air flow, i.e. they are all mounted within the chamber, it is not needed to provide an effective seal within the unit other than one that will avoid contamination likely to lead to failure.

The preferred snap fit in type approach to the design of the unit provides for a small low cost system.

Persons skilled in the art will appreciate the benefits and advantages that the method and related means and methods of the present invention confer.

We claim:

1. A pulsator unit for incorporation into a milking machine said pulsator unit comprising:

housing means defining a chamber having a first, second and third port, said first and second ports being provided with a valve seat inside said chamber, arm means mounted for movement within the chamber of said housing means, said arm means having a distal end region movable so that each of two opposite sides of said distal end region is seatable on only one said valve seat of said first and second ports at any one time to close only one of said first and second ports, biasing means for biasing said arm means to close one of said first port and said second port, and electrically actuable means for moving said arm means to open said one of said first and second ports closed by said biasing means acting on said arm means and to close the other of said first and second ports so that when said arm means closes said second port, said first and third ports are in communication via said chamber, and, when said arm means closes said first port, said second and third ports are in communication via said chamber, said electrically actuable means having at least one pair of electrical connections engageable externally of said chamber of said housing means, said first and third ports being located on a common side of said housing means to allow a plug engagement of the pulsator unit into a receiver which provides a vacuum source to said first port and a connection to said third port while the second port is connectable to or vents from a gas source.

2. A pulsator unit as claimed in claim 1, wherein said electrical connections are positioned so as to allow electrical contact to be made during said plug engagement into said receiver.

3. A pulsator unit as claimed in claim 1, wherein said arm means is mounted for pivotal movement.

4. A pulsator unit as claimed in claim 1, wherein said electrically actuable means includes a solenoid.

5. A pulsator unit as claimed in claim 1, wherein said biasing means is a spring.

6. A pulsator unit as claimed in claim 1, wherein said third port is connectable to the atmosphere.

7. A pulsator unit as claimed in claim 1, wherein said first and third ports are provided with nipples to provide passageways from said chamber.

8. A pulsator unit as claimed in claim 1, wherein said electrically actuable means is located inside of said housing means.

9. In a pulsation system of a milking machine, a replaceable plug engaged pulsator unit comprising:

housing means defining a chamber having a first, second and third port, said first and second ports being provided with a valve seat inside said chamber, arm means mounted for movement within the chamber of said housing means, said arm means having a distal end region movable so that each of two opposite sides of said distal end region is seatable on only one said valve seat of said first and second ports at any one time to close only one of said first and second ports, biasing means for biasing said arm means to close one of said first port and said second port, and electrically actuable means for moving said arm means to open said one of said first and second ports closed by said biasing means acting on said arm means and to close the other of said first and second ports so that when said arm means closes said second port, said first and third ports are in communication via said chamber, and, when said arm means closes said first port, said second and third ports are in communication via said chamber, said electrically actuable means having at least one pair of electrical connections engageable externally of said chamber of said housing means, said first and third ports being located on a common side of said housing means to allow a plug engagement of the pulsator unit into a receiver which provides a vacuum source to said first port and a connection from a pulsation control zone of a milking cup to said third port while the second port is connectable to or vents from a gas source, said third port venting from the atmosphere, said first port being connected to a source of vacuum, and said electrical connections being energizable under action of the milking machine so as to impart a control of the pulsation in at least one milking cup of a milking cup cluster.

10. A pulsator unit as claimed in claim 9, wherein said electrical connections are positioned so as to allow electrical contact to be made during said plug engagement into said receiver.

11. A pulsator unit as claimed in claim 9, wherein said arm means is mounted for pivotal movement.

12. A pulsator unit as claimed in claim 9, wherein said electrically actuable means includes a solenoid.

13. A pulsator unit as claimed in claim 9, wherein said biasing means is a spring.

14. A pulsator unit as claimed in claim 9, wherein said third port is connectable to the atmosphere.

15. A pulsator unit as claimed in claim 9, wherein said first and third ports are provided with nipples to provide passageways from said chamber.

16. A pulsator unit as claimed in claim 9, wherein said electrically actuable means is located inside of said housing means.

* * * * *